US005235748A

United States Patent [19]

Jahn

[11] Patent Number: 5,235,748

[45] Date of Patent: Aug. 17, 1993

[54] SEAL CUTTER

[76] Inventor: Albert J. Jahn, P.O. Box 1272, Arvada, Colo. 80001-1272

[21] Appl. No.: 891,753

[22] Filed: Jun. 1, 1992

[51] Int. Cl.[5] .......... B67B 7/02; B25F 1/00; G01B 5/08

[52] U.S. Cl. .......... 30/1.5; 7/164; 33/783

[58] Field of Search .......... 30/1.5, 2, 123, 102; 7/163, 164; 33/783, 785

[56] References Cited

U.S. PATENT DOCUMENTS

| | | | |
|---|---|---|---|
| 1,102,124 | 6/1914 | Baptiste . | |
| 1,308,694 | 7/1919 | Boswell | 7/164 |
| 2,068,020 | 1/1937 | Grounds | 30/2 |
| 2,439,894 | 4/1948 | Jahn et al. | 30/2 |
| 2,718,692 | 9/1955 | Krzanowski | 30/1.5 |
| 2,896,317 | 7/1959 | Vaive | 30/1.5 |
| 3,041,731 | 7/1962 | Keszler | 33/783 |
| 3,203,087 | 8/1965 | Jahn | 30/1.5 |
| 4,151,643 | 5/1979 | Pomante | 30/1.5 |
| 4,503,612 | 3/1985 | Davis | 30/2 |
| 4,845,844 | 7/1989 | Allen | 30/1.5 |
| 5,079,838 | 1/1992 | Stallings, Jr. | 30/1.5 |

FOREIGN PATENT DOCUMENTS

| | | | |
|---|---|---|---|
| 19632 | 12/1904 | Fed. Rep. of Germany | 30/1.5 |
| 283408 | 4/1915 | Fed. Rep. of Germany . | |
| 1924399 | 11/1970 | Fed. Rep. of Germany . | |

*Primary Examiner*—Frank T. Yost
*Assistant Examiner*—Paul M. Heyrana
*Attorney, Agent, or Firm*—Duane Burton

[57] ABSTRACT

A seal cutter for cutting seal material formed on a bottle neck, such as a wine bottle, includes a handle, a stationary jaw member and a movable jaw member. The movable jaw member is formed with a base portion slidably mounted to a track formed on the handle. A spring biased adjustment member is slidably mounted within a channel formed in the handle for adjustably locking the position of the movable jaw member with respect to the stationary jaw member. The adjustment member includes a triangular shaped tooth that mates with triangular shaped slots formed on the base of the movable jaw member to lock the position of the movable jaw member. A cutter wheel is rotatably mounted to the stationary jaw member for cutting the seal material on a bottle that is held between the stationary and movable jaw members.

18 Claims, 3 Drawing Sheets

SEAL CUTTER

FIELD OF THE INVENTION

This invention relates to cutting tools and more particularly to a seal cutter for cutting the seal around the necks of bottles and the like.

BACKGROUND OF THE INVENTION

Some bottles, particularly those containing liquor, are sealed using a plastic or metallic foil seal formed as a sheath that covers the opening and upper part of the neck of the bottle. Wine bottles, for instance, are generally sealed with a cork which is then covered with a plastic or foil seal. The seal functions to provide a visual seal and to protect the opening of the bottle from damage and contaminants.

In the past it has been customary to remove such a seal prior to removing the cork and dispensing the contents of the bottle. Although a corkscrew may effectively remove a cork through such a seal, unless the seal is removed or partially cutaway prior to pulling the cork, a rough or jagged edge remains around the bottle opening. This makes pouring from the bottle difficult, or at least messy.

To overcome this problem, the seal can be completely removed from the neck of the bottle, before removing the cork. This is often difficult, however, because the seal is typically formed of a tough resilient material that is tightly wound around the outside of the bottle. In addition, dining etiquette is such that only the seal material around the bottle opening is removed. The remaining seal, on the neck of the bottle, is left intact to provide what is regarded as a proper or appealing appearance for serving from the bottle.

The seal is typically cut away from the bottle opening using a straight blade knife that is held against the seal and rotated around the bottle. Such a knife may be built into a waiter's style corkscrew. This operation may be time consuming and sometimes difficult, even for one of considerable skill in using such a knife.

It is also possible to cut away the seal using a special cutting tool. Cutting tools for removing such seals have been known since at least the 1914 U.S. Pat. No. 1,102,124 to Baptiste. U.S. Pat. Nos. 2,439,894 and 3,203,087 to Jahn disclose more recent cutting tools for bottle seals. Another even more recent cutting tool is disclosed in U.S. Pat. No. 4,845,844 to Allen. Finally, U.S. Pat. No. 4,151,643 to Pomante discloses a cutting tool for cutting away safety closures used in the packaging of drugs.

Each of these tools may function effectively for its intended purpose. In general, however, they each suffer from some limitations and none has received widespread commercial acceptance. Some of these tools are difficult to operate or may not accommodate bottles having different neck sizes or styles. Others may not be adaptable to manufacture using low cost materials such as injection molded plastics, and may be too expensive for household consumers.

Accordingly there is a need in the art for a low cost tool that can be easily operated by an unskilled user to cut a plastic or foil seal on a bottle. There is a further need for a tool that can accommodate a range of bottle styles and sizes.

It is therefor an object of the present invention to provide a tool that can be used to cut a seal on a neck of a bottle, such as a wine bottle, having a foil or plastic seal. It is a further object of the present invention to provide a tool that can be used on different styles and sizes of bottles. It is yet another object of the present invention to provide a tool that is simple in construction, easy to use, and relatively inexpensive to manufacture. It is also an object of this invention to provide a light weight, inexpensive tool to sever the plastic seal formed on a bottle at the base of the cap or cork.

SUMMARY OF THE INVENTION

In accordance with the present invention, a seal cutter for cutting a foil or plastic seal of a bottle is provided. The seal cutter, generally stated, includes; a handle; a stationary jaw member mounted to the handle; a circular cutter wheel rotatably mounted to the stationary jaw member; a movable jaw member including a base portion slidably mounted to the handle; and a spring biased adjustment member slidably mounted to the handle for locking the position of the movable jaw member on the handle.

The jaw members are generally arcuate in shape adapted to adjustably engage the outer circumference of a bottle neck. The stationary jaw member includes a clevis formed on its distal end for rotatably mounting the circular cutter wheel. In addition, the stationary jaw member includes a locating rib for properly positioning the bottle neck between. the jaw members with the cutter wheel cuttably engaging the seal material.

The movable jaw member is formed with a base having a plurality of triangular shaped slots. The construction of the base is similar to that of a slotted rack of a rack and pinion linkage. The base slides within a T-shaped track formed on the handle in a direction generally transverse to a longitudinal axis of the handle. With this arrangement the movable jaw member can be slid with respect to the stationary jaw member, and adjustably locked for positioning a bottle neck between the jaw members with the cutter wheel engaging the seal material.

The locking member is also slidably mounted to a channel formed in the handle but in a direction generally along or parallel to the longitudinal axis of the handle. The locking member includes a tooth formed to engage one of the triangular slots formed in the base of the movable jaw member and to lock the position of the movable jaw member. The mating shape of the tooth and triangular shaped slots also used to initiate a wedging motion to clamp the bottle neck between the jaw members with the cutter wheel engaging the seal material. A compression spring biases the locking member and tooth into engagement with a desired slot of the movable jaw member. The locking member and movable jaw member are adapted to be manipulated by a users thumb or fingers to position a bottle neck between the jaw members.

In use, a bottle neck is positioned between the jaws and the locking member and movable jaw are manipulated such that the bottle neck is firmly positioned or clamped between the jaw members with the cutter wheel engaging the seal material. The ergonometrics of the seal cutter are such that the locking member and movable jaw can be easily manipulated while the bottle is effectively positioned between the jaws.

The handle can then be rotated around the bottle such that the cutter wheel circumscribes the neck of the bottle and cuts the seal material. The bottle itself may also be partially spun to effect the 360 degree rotation of the cutter wheel around the bottle neck. The comfort and ease of this action, and of the cutting engagement of the cutter wheel with the seal material, is enhanced by the shape and positioning of the components of the tool and by the firm retention of the bottle neck between the adjustable jaws. In particular, minimum user action is required in effecting the force necessary for the cutter wheel to cut the seal material.

Once the seal is completely severed, the locking member and adjustable jaw member may be manipulated to release the bottle from between the jaws. To release, pressure is applied with the thumb against the bottle neck.

Other objects, advantages and capabilities of the present invention will become more apparent as the description proceeds.

DESCRIPTION OF THE PREFERRED EMBODIMENT

Figure 1:
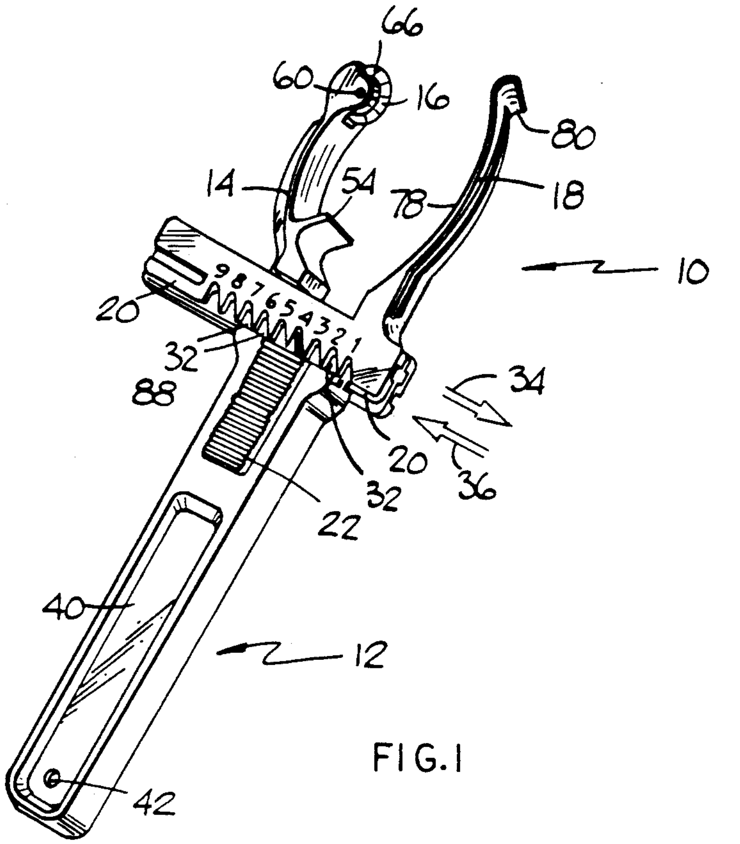
FIG. 1 is a perspective view of a seal cutter constructed in accordance with the invention.
Figure 2:
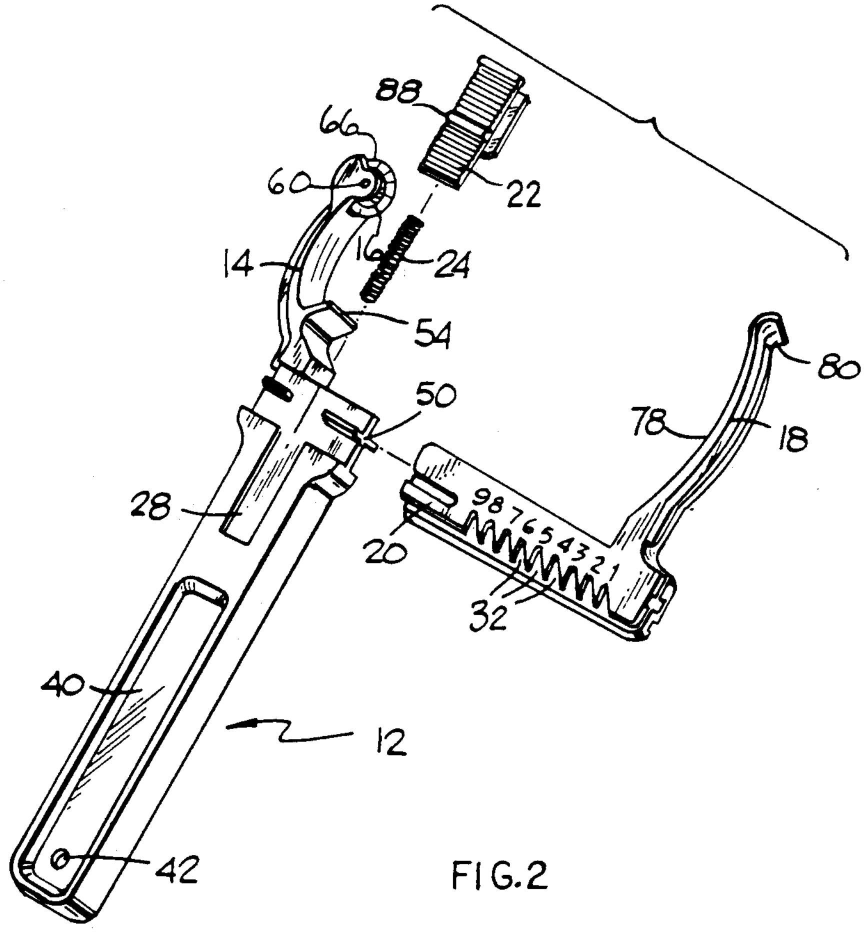
FIG. 2 is an exploded view showing the individual components of the seal cutter shown in FIG. 1.

Referring now to FIGS. 1 and 2, a seal cutter constructed in accordance with the invention is shown and generally designated as 10. The seal cutter 10, generally stated, includes;

a handle 12;

a stationary jaw member 14 mounted to the handle 12;

a circular cutter wheel 16 rotatably mounted at a distal end of the stationary jaw member 14;

a movable jaw member 18, including a base portion 20, slidably mounted to the handle 12; and an adjustment member 22 slidably mounted to the handle 12 and biased by a compression spring 24 (FIG. 2) for locking the position of the jaw member 18 on the handle 12.

The assembly of the components of the seal cutter 10 is substantially as shown in FIG. 2. This assembly provides a tool for cutting a plastic or foil seal of a bottle. The movable jaw member 18 includes the multi slotted base portion 20 that is slidably mounted on a T-shaped track 50 formed in the handle 12. This allows the movable jaw member 18 to be moved in and out with respect to the stationary jaw member 14 for clamping a bottle neck therebetween.

The adjustment member 22 is also slidably mounted within a channel 28 (FIG. 2) formed in the handle 12. The adjustment member 22 includes a tooth 30 that registers with a desired triangular shaped slot 32 formed on the base portion 20 of the movable jaw member 18 to hold the base portion 20 and thus the movable jaw member 18 in a desired locked position.

In use, the movable jaw member 18 may be manipulated such that a bottle neck can be initially placed between the jaw members 14, 18. The movable jaw member 18 may be slid outwardly as indicated by arrow 34 (FIG. 1) to initially space the jaw member 14, 18 for placing the neck of the bottle between the jaw members 14, 18. The movable jaw member 18 may then be slid inwardly as indicated by arrow 36 (FIG. 1) for clamping the bottle neck between the jaw members 14, 18 with the cutter wheel 16 engaging the seal material of the bottle.

Registration of the tooth 30 of the adjustment member 22 with a desired triangular slot 32 of the base 20 of the movable jaw member 18 holds the movable jaw member 18 in the desired position. In addition, if the adjustment member is manipulated upward by a user, the shape of the tooth 30 and triangular shaped slot 32 provides a wedging action for forcing the cutter wheel 16 into engagement with the seal material of the bottle.

The construction of the components of the seal cutter will now be described in detail.

HANDLE

Figure 3:
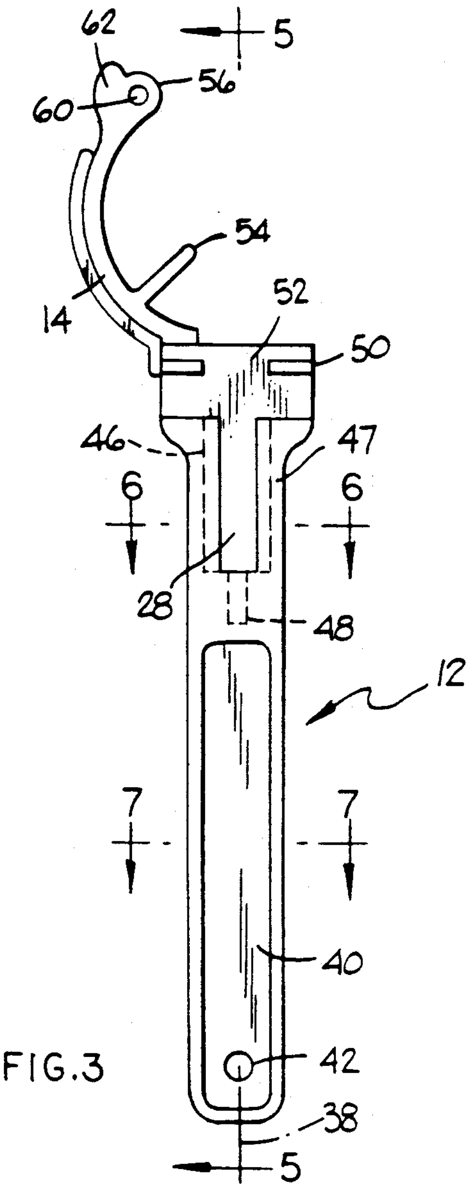
FIG. 3 is a front elevation view of a handle and stationary jaw component of the seal cutter shown in FIG. 1.
Figure 5:
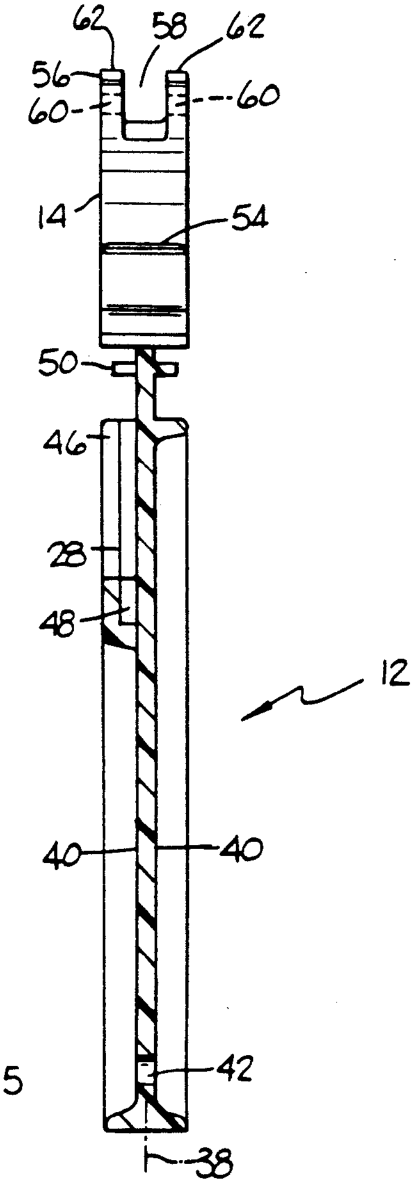
FIG. 5 is a cross sectional view taken along section line 5—5 of FIG. 3.

With reference to FIGS. 3–7, the handle 12 and the stationary jaw member 14 are formed as one piece. A material such as plastic or nylon may be injection molded into the desired unitary configuration. The handle 12 is elongated in shape formed substantially as shown in FIGS. 3 and 5 for grasping by a user. As clearly shown in FIG. 6, a cross section of the main body of the handle is substantially similar to that of an I-beam. This I-beam shape is symmetrical about plannar axes 68, 70. The handle 12 is also symmetrically formed about a longitudinal axis 38 (FIG. 3).

With reference to FIGS. 3 and 5, the main body of the handle 12 contains an inset surface 40 on either side. A logo or other identifying indicia may be conveniently printed or integrally molded on the inset surfaces 40 of the handle 12. A through opening 42 is formed through the inset surfaces at an end of the handle 12. A chain or cord (not shown) may be placed through the opening 42 to facilitate storage of the seal cutter 10. Similarly the opening 42 may be used to hang or store the seal cutter 10 on a fastener (not shown) such as a hook or nail.

Figure 8:
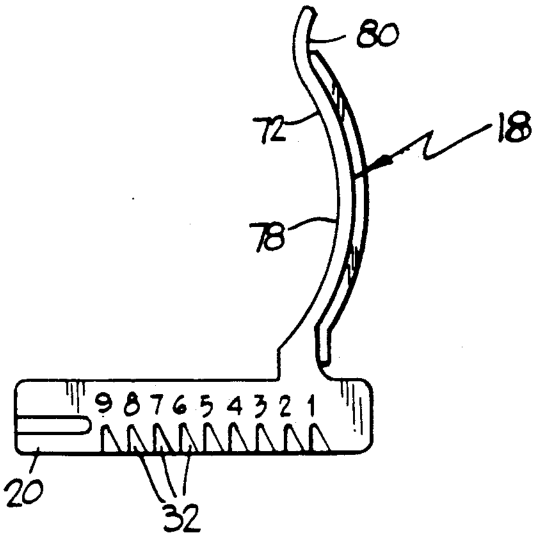
FIG. 8 is a front elevation view of a movable jaw component of the seal cutter shown in FIG. 1.
Figure 9:
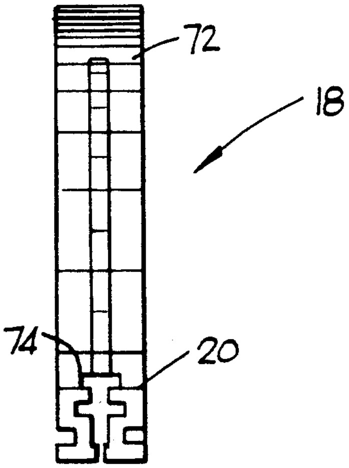
FIG. 9 is side elevation view of FIG. 10.
Figure 10:
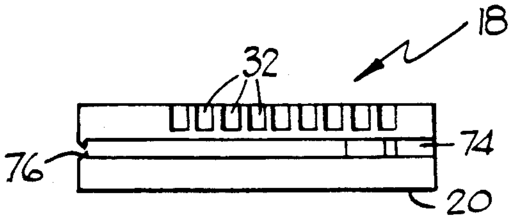
FIG. 10 is a bottom view of FIG. 8.

The handle 12 includes a molded channel 28 wherein the adjustment member 22 (FIGS. 11–13) is slidably mounted for engagement with a triangular slot 32 of the base portion 20 of the movable jaw members 18 (FIGS. 8–10). The channel 28 formed on the handle 12 for the adjustment member 22 is situated generally along the longitudinal axis 38 of the handle 12.

Figure 4:
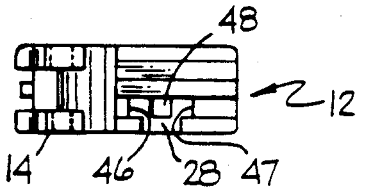
FIG. 4 is a plan view of FIG. 3.
Figure 6:
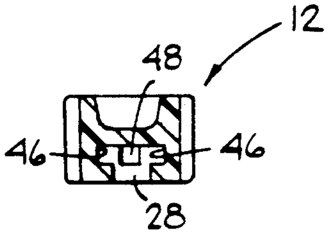
FIG. 6 is a cross sectional view taken along section line 6—6 of FIG. 3.
Figure 7:
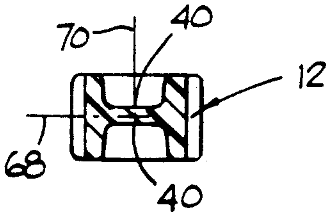
FIG. 7 is a cross sectional view taken along section line 7—7 of FIG. 3.

The channel 28, as clearly shown in FIGS. 4 and 6 is generally T-shaped and includes recessed parallel vertical ribs 46, 47. The adjustment member 22 (FIGS. 11–13) is formed with a shape that mates with the T-shaped channel 28 for slidable up and down movement within the channel 28 along longitudinal axis 38 of the handle 12. The adjustment member 22 slides within and is retained by the vertical ribs 46, 47 of the channel 28.

In addition, the channel 28 includes a counterbored portion 48 for mounting the spring 24 (FIG. 2) that biases the adjustment member 22 upward so that the tooth 30 (FIG. 11) of the adjustment member 22 contacts a desired triangular slot 32 (FIG. 8) in the base portion 20 of the movable jaw member 18.

The handle 12 also includes a generally T-shaped track 50 wherein the movable jaw member 18 (FIGS. 8–10) is slidably mounted to the handle 12. The T-shaped of the track 50 of the handle 12 is clearly shown in FIG. 5. As will hereinafter be more fully explained, the base portion 20 of the movable jaw member 18 includes a T-shaped recess 74 (FIG. 9) that mates with the T-shaped track 50 (FIG. 5) of the handle 12. As shown in FIG. 3, the T-shaped track 50 of the handle 12 is formed with a space 52 or non-continuous portion on one side adjacent to the channel 28 on the handle 12 for the adjustment member 22. The space 52 permits assembly of the adjustment member 22 into the channel 28 of the handle 12.

As previously stated, the stationary jaw member 14 is formed or molded integrally with the handle 12. As shown in FIG. 3, the stationary jaw member 14 is generally arcuate in shape. The stationary jaw member 14 includes a locating rib 54 that is adapted to contact the neck of the bottle and permit the cutter wheel 16 (FIG. 14) to engage the seal material formed on the neck of the bottle.

In addition, the stationary jaw member 14 includes a clevis portion 56 at its distal end for rotatably mounting the cutter wheel 16 (FIG. 14) to the stationary jaw member 12. As shown in FIG. 5, the clevis portion 56 includes parallel spaced end members 62 that define an opening 58 for the cutter wheel 16. Through bores 60 extend through the end members 62 for locating a retaining pin 64 (FIG. 14) for freely rotatably mounting the cutter wheel 16.

Figure 14:
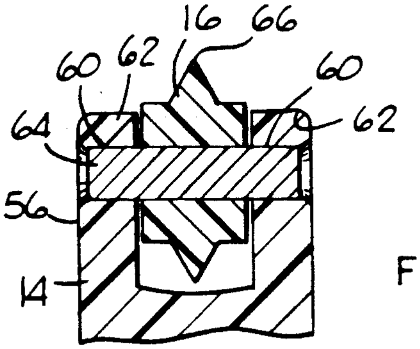
FIG. 14 is a cross sectional view of the cutter wheel component of the seal cutter shown in FIG. 1.

The assembly of the cutter wheel 16 to the clevis portion 56 of the stationary jaw member 14 is clearly shown in FIG. 14. The cutter wheel 16 is generally circular in shape and is formed with a sharp cutting edge 66 along its outer circumferential edge. The cutter wheel 16 may be formed of a hard material such as metal. The cutter wheel 16 is freely rotatably mounted on the retaining pin 64 which is press-fitted to the bore 60 through the clevis portion 56 of the stationary jaw member 12.

MOVABLE JAW MEMBERS

Referring now to FIGS. 8–10, the movable jaw member 18 is shown. The movable jaw member 18 is of a one piece construction and includes the base portion 20 and a generally arcuate shaped jaw 72. As with the handle 12, the movable jaw member 18 may be formed of a material such as nylon or plastic molded into the desired configuration.

The arcuate jaw 72 of the movable jaw member 18 is formed substantially as shown in FIG. 8 with an inwardly facing concave portion 78 and an outwardly facing concave portion 80 at a distal end. The inwardly facing concave portion 78 substantially matches the curvature of the stationary jaw member 14 formed on the handle 12 and is adapted for contacting the neck of a bottle placed between the jaw members 14, 18.

As shown in FIG. 9, the base portion 20 of the movable jaw member 18 includes a generally T-shaped slot 74 that is sized and shaped to mate with the T-shaped track 50 (FIG. 5) formed in the handle 12. As shown in FIG. 10, the T-shaped slot 74 is dovetailed 76 at one end to provide some frictional contact with the handle 12.

With this arrangement the base member 20 can be slid on the track 12 and supported by the track 12. In use, the movable jaw member 18 can be manipulated for moving the arcuate jaw 72 inwardly or outwardly with respect to the stationary jaw member 14 formed on the handle 12.

As shown in FIGS. 8–10, the base portion 20 of the movable jaw member 18 also includes a row of spaced triangular slots 32. The triangular slots 32 register with the tooth 30 in the adjustment member 22 (FIGS. 11–13) for locking the movable jaw member 18 in a desired position on the handle 12. In addition, when the adjustment member 22 is pushed upward, the triangular slots 32 interact with the tooth 30 on the adjustment member 22 to help wedge the cutter wheel 16 into engagement with the seal material on the bottle to be cut.

In an illustrative embodiment, there are nine triangular slots 32. These slots 32 may be numbered, as shown in FIG. 8, to provide a spacing reference for the movable jaw member 18 with respect to the stationary jaw member 14. Alternately, the movable jaw member 18 may be formed with a greater or lesser number of slots.

ADJUSTMENT MEMBER

Figure 11:
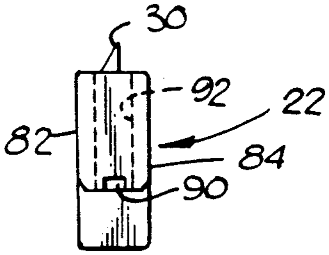
FIG. 11 is a front elevation view of an adjustment member component of the seal cutter shown in FIG. 1.
Figure 12:
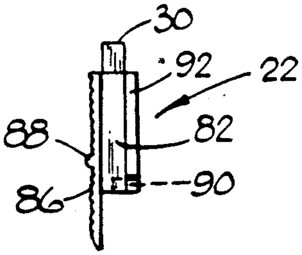
FIG. 12 is a side elevation view of FIG. 13.
Figure 13:
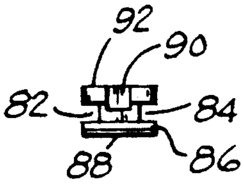
FIG. 13 is a bottom view of FIG. 12.

Referring now to FIGS. 11, 12, and 13, the adjustment member 22 is shown in detail. The adjustment member 22 is sized and shaped to be slidably retained in the channel 28 formed in the handle and previously described. As such, the adjustment member 22 includes vertical slots 82, 84 (FIG. 13) that mate with the vertical ribs 46, 47 (FIG. 4) formed in the channel 28 of the handle 12.

The adjustment member 22 also includes a front or exterior surface 86, which as shown in FIG. 12, is longer than the vertical slots 82, 84. In addition, the exterior surface 86 includes a raised rib 88 (FIG. 12) that facilitates manipulation of the adjustment member 22 (up or down) within the channel 28 by a user's thumb.

The tooth 30 of the adjustment member 22 is formed on a rear or interior facing surface 92 (FIG. 11) of the adjustment member 22. The tooth 30 is generally triangularly shaped to match the triangular shape of the slots 32 (FIG. 8) formed in the base portion 20 of the movable jaw member 18. Although the adjustment member 22 and handle 12 are made from a material, such as nylon, having a relatively low coefficient of friction, based upon the tolerances used during manufacture, there is still adequate friction between the contacting surface of the adjustment member 22 and the handle 12 such that the adjustment member 22 normally remains in place where it has been positioned. The adjustment member 22 may be positively secured with the tooth 30 located on one of the triangular slots 32 by forming a generally rectangular shaped cut-out 90 (FIGS. 11–13) on the interior surface 92 of the adjustment member 22 as a seat for receiving and retaining a compression spring 24 (FIG. 2) mounted in the counterbore 48 of the handle.

With this arrangement, the adjustment member 22 can be slidably retained within the channel 28 formed in the handle 12 and biased upwardly by the compression spring 24. The tooth 30 of the adjustment member 22 is normally pushed into engagement with a triangular shaped slot 32 of the base 20 of the movable jaw member 20 by the compression spring 24.

For moving the movable jaw member 20, the adjustment member 22 can be depressed (moved downward) by a user against the bias of the compression spring 24. This moves the tooth 30 out of the triangular slot 32 and allows the movable jaw member 20 to be adjusted in or out with respect to the stationary jaw member 14 as required. Once the adjustment member 22 is released by the user, the compression spring 24 pushes the adjustment member 22 upward so that the tooth engages another triangular slot 32. The adjustment member 22 may also be pushed upward by the user so that the tooth 30 acts as a wedge against the slot 32 to force the cutter wheel 16 into engagement with the seal material on the bottle.

Thus, the seal cutter provides a simple yet effective tool for cutting to enable the removing of a seal of a bottle such as a wine bottle. Accordingly, it is intended that the scope of the invention be limited only by the claims which follow

What is claimed is:

1. A tool for cutting material covering a bottle neck, comprising:

a one piece handle including a generally T-shaped track;

a one-piece stationary jaw member mounted to the handle;

a movable jaw member including a base portion formed with a generally T-shaped slot slidably mounted to the T-shaped track of the handle and formed with a plurality of generally triangular shaped slots;

a circular cutter rotatably mounted to one of the jaw members;

an adjustment means slidably mounted to the handle including a generally triangular shaped tooth member that mates with a triangular shaped slot of the movable jaw member for locking the position of the movable jaw member with respect to the stationary jaw member.

2. The tool as claimed in claim 1 and wherein:

the adjustment means is biased with the tooth of the adjustment member in engagement with a slot of the movable jaw member by a compression spring.

3. The tool as claimed in claim 1 and wherein:

the circular cutter is mounted on a distal end of the stationary jaw member.

4. The tool as claimed in claim 1 and wherein:

the handle and stationary jaw member are of a one piece plastic molded construction.

5. The tool as claimed in claim 1 and wherein:

the stationary jaw member includes a locating rib for locating a position of the bottle neck with respect to the cutter wheel.

6. The tool as claimed in claim 1 and wherein:

the adjustment means is slidably mounted in a slot on the handle and includes parallel spaced slots that slide on parallel spaced ribs in the slot formed in the handle.

7. A seal cutter for cutting seal material of a bottle comprising:

an elongated handle;

a generally arcuately shaped stationary jaw member formed on the handle and including a locating rib for contacting the bottle;

a circular cutter wheel rotatably mounted to a distal end of the stationary jaw member;

a generally arcuately shaped movable jaw member formed with a base portion slidably mounted to the handle for movement towards and away from the stationary jaw member;

means for adjustably locking the position of the movable jaw member for clamping the bottle between the jaw members with the cutter wheel engaging the seal material including an adjustment member slidably mounted to the handle and having a tooth that mates with a slot formed on the base of the movable jaw member.

8. The seal cutter as claimed in claim 7 and further comprising:

means for biasing the tooth into engagement with the slot.

9. The seal cutter as claimed in claim 8 and wherein:

means for biasing the tooth into engagement with a slot formed on the base portion is a compression spring mounted to the handle in contact with the adjustment member.

10. The seal cutter as claimed in claim 7 and wherein:

the tooth is generally triangular shaped and mates with one of a plurality of generally triangular shaped slots formed on the base portion of the movable jaw member.

11. The seal cutter as claimed in claim 10 and wherein:

the handle and stationary jaw member are formed as a unitary molded plastic member.

12. A seal cutter for cutting seal material formed on a bottle neck comprising:

an elongated handle having a longitudinal axis;

a generally arcurately shaped stationary jaw member formed on the handle and including a locating rib and a clevis portion formed on a distal end;

a circular cutter wheel freely rotatably mounted to the clevis portion;

a movable jaw member including a base portion slidably mounted to the and a generally arcuate shaped jaw with the base member having a plurality of generally triangular shaped slots;

an adjustment member slidably mounted to a channel formed in the handle and including a generally triangular shaped tooth formed to contact a triangular shaped slot in the base of the movable jaw member;

whereby the bottle may be placed between the stationary jaw member and the movable jaw member and the movable jaw member locked in position by the adjustment member with the cutter wheel contacting the seal material and the handle may be rotated around the bottle for cutting the seal material.

13. The seal cutter as claimed in claim 12 and wherein:

the handle is formed with a generally T-shaped rail and the base of the movable jaw is slidably mounted on the rail in a direction generally traverse to the longitudinal axis of the handle.

14. The seal cutter as claimed in claim 13 and wherein:

the adjustment member is mounted for movement generally along the longitudinal axis of the handle.

15. The seal cutter as claimed in claim 14 and wherein:

the channel for the adjustment member includes parallel spaced ribs and the adjustment member includes parallel spaced slots that slide within the ribs.

16. The seal cutter as claimed in claim 15 and wherein:

a compression spring is mounted to the handle for biasing the adjustment member such that the triangular shaped tooth engages a triangular shaped slot.

17. The seal cutter as claimed in claim 16 and wherein:

the handle, stationary jaw member, and movable jaw member are formed of nylon.

18. The seal cutter as claimed in claim 17 and wherein:

the cutter wheel is formed of nylon and has a sharp circumferential cutting edge.

* * * * *